(12) United States Patent
Sebastian et al.

(10) Patent No.: US 9,081,090 B2
(45) Date of Patent: Jul. 14, 2015

(54) SYSTEM AND METHOD FOR INCREASING COHERENCE LENGTH IN LIDAR SYSTEMS

(71) Applicant: Digital Signal Corporation, Alexandria, VA (US)

(72) Inventors: Richard L. Sebastian, Frederick, MD (US); Kendall L. Belsley, Falls Church, VA (US); Stephan Schulz, Bethesda, MD (US)

(73) Assignee: Digital Signal Corporation, Chantilly, VA (US)

( * ) Notice: Subject to any disclaimer, the term of this patent is extended or adjusted under 35 U.S.C. 154(b) by 81 days.

(21) Appl. No.: 13/843,227

(22) Filed: Mar. 15, 2013

(65) Prior Publication Data

US 2014/0269790 A1  Sep. 18, 2014

(51) Int. Cl.
| | |
|---|---|
| H01S 3/10 | (2006.01) |
| G02B 26/06 | (2006.01) |
| G01S 17/32 | (2006.01) |
| G01J 9/00 | (2006.01) |
| G01S 7/491 | (2006.01) |
| G01S 7/497 | (2006.01) |

(52) U.S. Cl.
CPC .............. *G01S 17/325* (2013.01); *G01J 9/00* (2013.01); *G01S 7/497* (2013.01); *G01S 7/4915* (2013.01); *G02B 26/06* (2013.01)

(58) Field of Classification Search
CPC ...... G01S 7/4861; G01S 13/89; G01S 17/325; G01S 17/89; G01S 7/481; G01S 7/499; G01S 7/497; G01S 17/36; G01S 13/36; G01J 9/02; H01S 3/10053; H01S 3/10; G02B 26/06
See application file for complete search history.

(56) References Cited

U.S. PATENT DOCUMENTS 5,847,817 A * 12/1998 Zediker et al. ............... 356/5.09
7,345,744 B2 * 3/2008 Halmos et al. ................ 356/5.1

* cited by examiner

*Primary Examiner* — Luke Ratcliffe
*Assistant Examiner* — Vicente Rodriguez
(74) *Attorney, Agent, or Firm* — Toering Patents PLLC

(57) ABSTRACT

Various implementations of the invention compensate for "phase wandering" in tunable laser sources. Phase wandering may negatively impact a performance of a lidar system that employ such laser sources, typically by reducing a coherence length/range of the lidar system, an effective bandwidth of the lidar system, a sensitivity of the lidar system, etc. Some implementations of the invention compensate for phase wandering near the laser source and before the output of the laser is directed toward a target. Some implementations of the invention compensate for phase wandering in the target signal (i.e., the output of the laser that is incident on and reflected back from the target). Some implementations of the invention compensate for phase wandering at the laser source and in the target signal.

5 Claims, 3 Drawing Sheets

SYSTEM AND METHOD FOR INCREASING COHERENCE LENGTH IN LIDAR SYSTEMS

FIELD OF THE INVENTION

The invention is generally related to lidar systems (i.e., laser radar systems) measurements, and more particularly, to increasing coherence length in such lidar systems.

BACKGROUND OF THE INVENTION

Various conventional frequency modulated, continuous wave lidar systems exist. These lidar systems typically employ a laser source (i.e., laser), the selection of which requires a design trade off between speed of tuning and coherence length. Coherence length, in turn, impacts an effective range within which the lidar system is able to make accurate measurements. In other words, lasers capable of being tuned suffer from reduced coherence length and thus, reduced effective range. This presents a disadvantage for frequency modulated lidar.

In addition, these conventional lidar systems are typically unable to measure (i.e., detect and/or characterize) certain vibrations on a surface of a target over a broad band of frequencies, particularly where the vibrations may have sub-micron amplitudes at any frequencies within the band. Due to various lidar system constraints, primarily sampling rates and down conversion, these vibrations often appear as additive noise at frequencies other than their actual frequency of vibration.

What is needed are systems and methods for improving performance of lidar systems.

SUMMARY OF THE INVENTION

Tunable laser sources typically suffer from "phase wandering" which may negatively impact a performance of a lidar system that employ such laser sources, typically by reducing a coherence length/range of the lidar system, an effective bandwidth of the lidar system, a sensitivity of the lidar system, etc. Conventional methods to compensate for phase wandering (also referred to herein as phase variance) are unable to do so across a wide band of frequencies.

Various implementations of the invention correct for phase variance of a laser source. In some implementations of the invention, a phase variance is compensated near the laser source and before the output of the laser is directed toward a target. The phase correction applied by these implementations is generally referred to herein as a "source phase correction."

In some implementations of the invention, the phase variance of the laser is detected and compensated in the target signal (i.e., the output of the laser that is incident on and reflected back from the target). The phase correction applied by these implementations is generally referred to herein as "target phase correction."

In some implementations of the invention, both source phase correction and target phase correction are applied.

These implementations, their features and other aspects of the invention are described in further detail below.

DETAILED DESCRIPTION

A conventional frequency modulated, continuous wave lidar system that employs a tunable laser source (i.e., lasers) typically suffers from reduced coherence length, which in turn, impacts an overall effective range of the lidar system. The presence of "phase wandering" (i.e., variation in phase over time, also "phase variance") in the output signals of these lasers negatively impacts the coherence length of the lidar system. Conventional methods to correct the output signals for phase wandering are unable to do so across a wide band of frequencies like those used by a frequency-modulated lidar system. As a result of phase wandering and other conventional system constraints, certain vibrations on a surface of a target, particularly those having sub-micron amplitudes, are difficult to measure because they may appear as additive noise at one or more frequencies within an effective bandwidth of the lidar system.

Various implementations of the invention are now described. In some implementations of the invention, a phase variance of a laser is corrected near the laser source and before the output of the laser is directed toward a target. The phase correction applied by these implementations is generally referred to herein as a "source phase correction." In some implementations of the invention, the phase variance of the laser is detected in the reference signal and subsequently corrected in the target signal (i.e., the output of the laser that is incident on and reflected back from the target). The phase correction applied by these implementations is generally referred to herein as "target phase correction." In some implementations of the invention, both source phase correction and target phase correction are applied.

Figure 1:
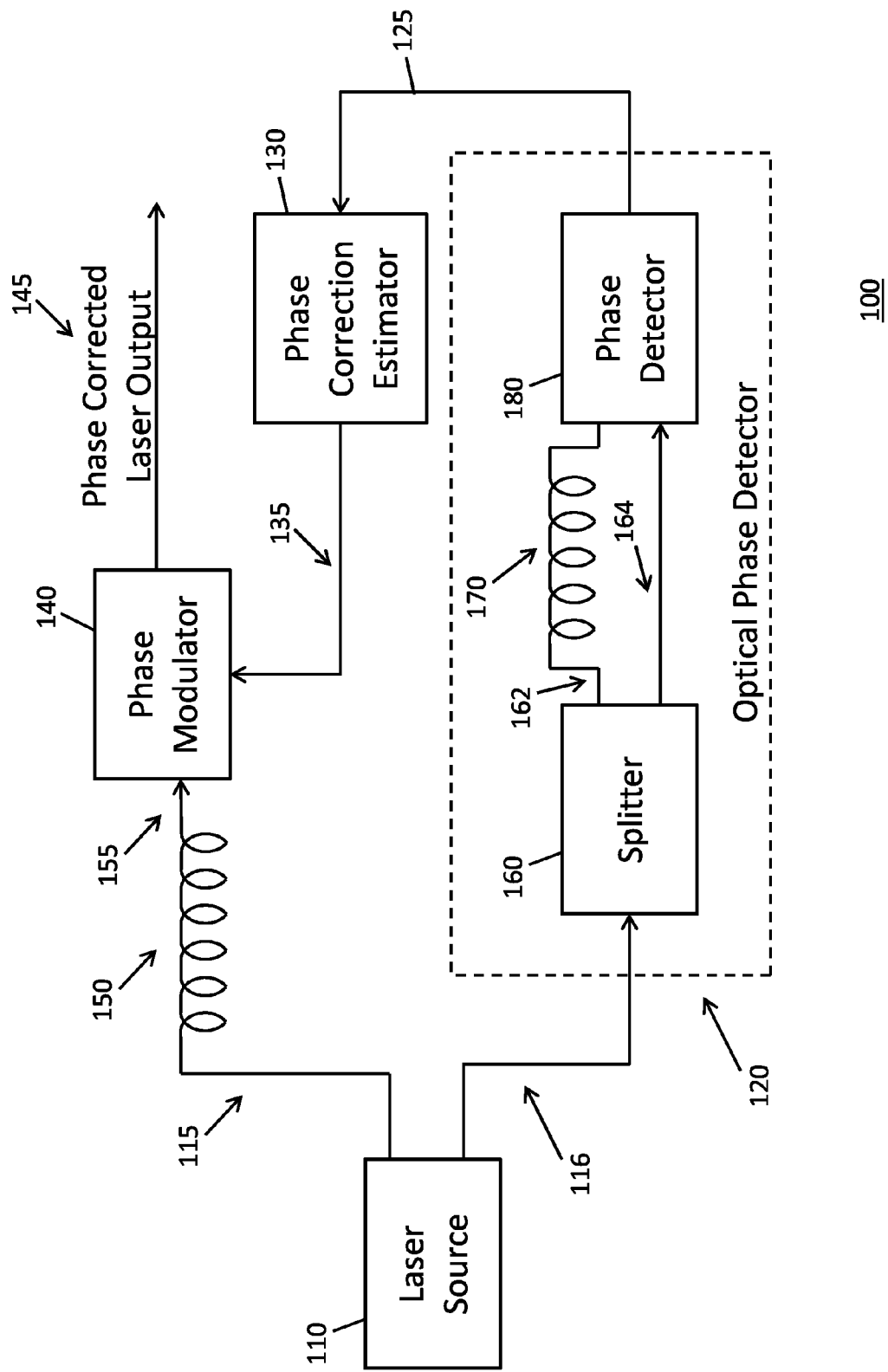
FIG. 1 illustrates a source phase correction system configured to correct a phase of an output of a laser source of a lidar system according to various implementations of the invention.

Source phase correction is now described with reference to FIG. 1. FIG. 1 illustrates a source phase correction system 100 configured to correct a phase of an output of a laser source 110 and provide a phase corrected laser output 145 according to various implementations of the invention. Source phase correction system 100 significantly reduces phase wandering appearing in phase corrected laser output 145. In some implementations, as a result of the source phase correction, a coherence length of a lidar system employing such a source phase correction system 100 is increased, which in turn may provide an increased effective range of the lidar system.

As illustrated in FIG. 1, source phase correction system 100 includes two optical paths, namely a laser output optical path 115 and a phase error path 116, in which a phase error of an output of laser source 110 is determined. In some implementations, an estimate of a phase correction to be applied to the output of laser source 110 is determined. The phase correction is used to correct the phase variance in the output of laser source 110 to ultimately produce phase corrected laser output 145.

Components of source phase correction system 100 along phase error path 116 are now described according to various implementations of the invention. Source phase correction system 100 along phase error path 116 includes a phase detector 120 and a phase correction estimator 130. In some implementations, phase detector is an optical phase detector 120, though other phase detectors may be used as would be appreciated. Optical phase detector 120 receives an output from laser source 110 and determines a phase difference 125 between the output of laser source 110 and a delayed output of laser source 110. More particularly, this phase difference corresponds to the relative difference in the phase of the output of laser source 110 at two different times separated by the delay. Because the actual phase error in the output of laser source 110 at any given point in time cannot be measured with conventional devices, this phase difference can be used to provide an approximation of the phase error and ultimately, estimate the phase correction to be applied to the output of laser source 110.

In some implementations, optical phase detector 120 includes a splitter 160 that splits the output of laser source 110 into two paths: a first path 162 which is optically delayed by a delay line 170 before being coupled to a phase detector 180; and a second path 164 which is coupled to phase detector 180. Delay line 170 introduces an optical delay between in the first path and the second path to determine the difference in phase of the output of laser source over the time of the optical delay.

In some implementations, the optical delay is selected to correspond to a substantial fraction of a coherence time of laser source 110. For example, in some implementations, the optical delay may be between ⅓ and ½ of the coherence length of laser source 110. In some implementations, the optical delay is selected to be less than half the time within which the phase variance of the output of laser source may vary by more than a full optical cycle (i.e., 360 degrees of phase).

Phase detector 180 measures phase difference 125 which corresponds to the relative phase between the output of laser source 110 and the delayed output of laser source 110. Measurements of phase difference 125 may be used to reduce and/or correct the phase variance in the output of laser source 110 and subsequently increase the overall coherence of laser source 110.

In some implementations, optical phase detector 120 comprises an interferometer, such as a Mach-Zehnder interferometer. In some implementations of the invention, first path 162 and second path 164 are coupled to an optical hybrid (not otherwise illustrated) that provides both in-phase and quadrature components of the phase difference as would be appreciated. In some implementations, optical phase detector 120 may comprise one or more photodetectors (not otherwise illustrated) that convert optical signals into electrical signals for further processing as would also be appreciated.

In some implementations of the invention, a shorter optical delay (e.g., less than ⅓ of the coherence length) is selected for optical phase detector 120 to provide a high bandwidth/high noise response for source phase correction system 100. In some implementations of the invention, a longer optical delay (e.g., greater than ½ of the coherence length) is selected for optical phase detector 120 to provide a low bandwidth/low noise response for source phase correction system 100. In some implementations of the invention, a third path (not otherwise illustrated in FIG. 1) to provide for a first optical delay (e.g., delay 170) and a second optical delay and hence provide a separate phase difference over each of the respective delays. Such implementations may improve an overall performance of optical phase detector 120 as would be appreciated. In some implementations of the invention, multiple phase detectors 120 with different path delays may be used with their respective outputs combined to improve the phase correction estimate provided by phase correction estimator 130 as would be appreciated.

Phase correction estimator 130 receives phase difference 125 from phase detector 120 and determines a phase correction 135 to be applied to the output of laser source 110. Fluctuations in phase difference 125 over time may be used to estimate an instantaneous phase correction 135 to be applied to the output of laser source 110. In some implementations of the invention, a least squares estimator may be used to estimate the instantaneous phase correction 135 as would be appreciated.

Components of source phase correction system 100 along laser output optical path 115 are now described. In some implementations, source phase correction system 100 along laser output optical path 115 includes a delay line 150 coupled to laser source 110. Delay line 150 introduces an optical delay in laser output optical path 115 corresponding to and compensating for delays introduced by optical phase detector 120 and phase correction estimator 130 (as well as other optical components in source phase correction system 100) in phase error path 116 as would be appreciated. An optically delayed output 155 of delay line 150 is coupled to a phase modulator 140. Phase modulator 140 receives optically delayed output 155 and modulates it by phase correction 135 provided by phase correction estimator 130. An output of phase modulator 140 corresponds to phase corrected laser output 145.

Commercially available phase modulators are capable of shifting optical phase by at least a full optical cycle with bandwidths in excess of 1 GHz. Using such components, source phase correction system 100 may effectively increase the coherence of laser source 110 by a factor of at least two and possibly as much as several orders of magnitude.

As described, source phase correction system 100 conditions the output of laser source 110 to reduce phase variation in the output and thereby increase the coherence in phase corrected laser output 145, among other things. Phase corrected laser output 145 may be supplied to a lidar system such as that described in, for example, U.S. patent application Ser. No. 12/710,057, entitled "System and Method for Generating Three Dimensional Images Using Lidar and Video Measurements" and filed Feb. 22, 2010, which is incorporated herein by reference in its entirety.

Target phase correction is now described. Generally speaking, conventional lidar systems typically attempt to compensate for various system errors, including phase errors, among others and/or other noise, after down converting and/or down sampling the respective lidar signals (e.g., a reference signal and a target signal, sometimes also referred to as a reference arm signal and a target arm signal). As would be appreciated, the down sampling/down converting specifies a bandwidth of the lidar system consistent with the Nyquist frequency corresponding to the reduced sampling rate and frequencies outside this bandwidth present various challenges both in terms of an inability to measure signals at such frequencies and a degradation in the signal-to-noise ratio of other measurements.

Figure 2:
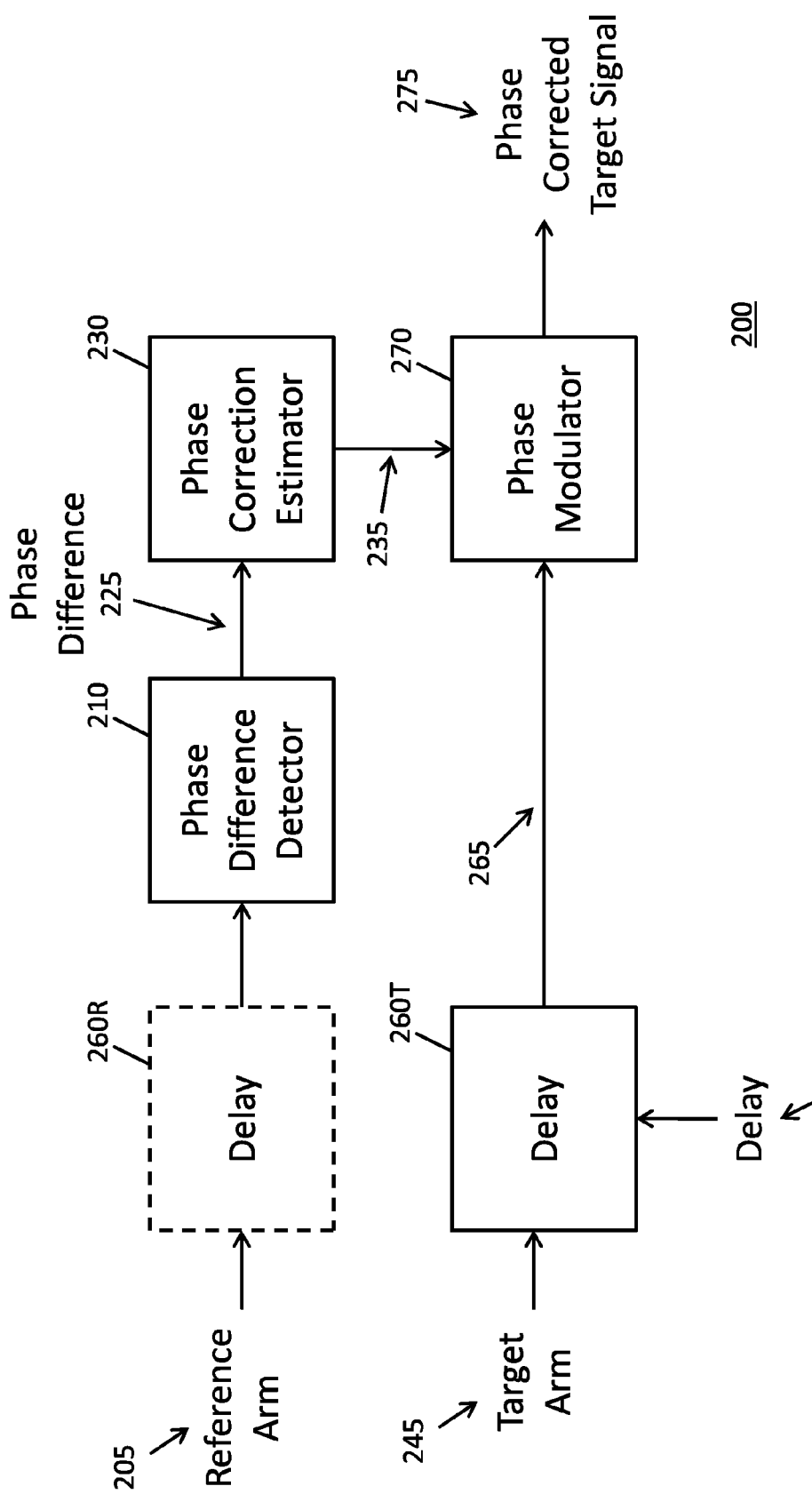
FIG. 2 illustrates a target phase correction system configured to correct a phase of a reflected target signal (i.e., target signal) received by a coherent lidar system according to various implementations of the invention.

FIG. 2 illustrates a target phase correction system 200 configured to correct a phase of a reflected target signal (i.e., target signal, target arm signal) received by a coherent lidar system according to various implementations of the invention.

In some implementations of the invention, target phase correction system 200 receives one or more inputs including a reference arm signal 205 and a target arm signal 245. Reference arm signal 205 corresponds to an output of a detector (typically, an interferometer and not otherwise illustrated in FIG. 2) that detects a reference beam originally split from an optical beam directed toward a target as would be appreciated. Target arm signal 245 corresponds to an output of a detector (also typically, an interferometer and not otherwise illustrated in FIG. 2) that detects a reflected portion of the optical beam incident on and reflected back from the target as would also be appreciated.

In some implementations, target phase correction system 200 includes a delay 260, illustrated in FIG. 2 as a delay 260T. Delay 260 receives target arm signal 245 and introduces a delay 250 into target arm signal 245. This delay corresponds to and compensates for delays introduced by other components of target phase correction system 200. Such delays may be associated with a phase difference detector 210, a phase correction estimator 230, other optical components in target phase correction system 200, and other processing delays, as well as a round trip path delay associated with a range to the target as would appreciated. Delay 260 outputs a delayed target arm signal 265. In some implementations, delay 260 may be implemented as two or more delay lines, namely delay 260T and an optional delay 260R (in reference arm 205) as would be appreciated. In some implementations, delay 260 may be implemented as optional delay 260R without delay 260T as would be appreciated. In such implementations, delay 260T and/or delay 260R and/or other delays 260 (not otherwise illustrated) compensate for delays in target phase correction system 200 as well as the underlying lidar system as would be appreciated.

In some implementations, target phase correction system 200 includes a phase difference detector 210. Phase difference detector 210 receives reference arm signal 205 and a reference oscillator signal (not otherwise illustrated) and outputs a phase difference 225. Phase difference 225 corresponds to a change in the phase of reference arm signal 205 over an interval of time. In some implementations, reference oscillator signal is generated coherently to the modulation of laser source 110 as would be appreciated.

In some implementations, target phase correction system 200 includes phase correction estimator 230. Phase correction estimator 230 receives phase difference 225 and estimates a phase correction 235 to be applied to target arm signal 245 to reduce or correct any phase error occurring in target arm signal 245. Similar to phase correction estimator 130, phase correction estimator 230 may include a least squares estimator to estimate phase correction 235 as would be appreciated.

In some implementations, target phase correction system 200 includes a phase modulator 270. Phase modulator 270 receives delayed target arm signal 265 from delay 260 and phase correction 235 from phase correction estimator 230 and outputs a phase corrected target signal 275.

In some implementations of the invention, target arm signal 245 may be either an optical signal or an electrical signal as would be appreciated. In some implementations of the invention, phase modulator 270 may be either an optical modulator or an electrical modulator, including a digital electrical modulator, as would also be appreciated.

Figure 3:
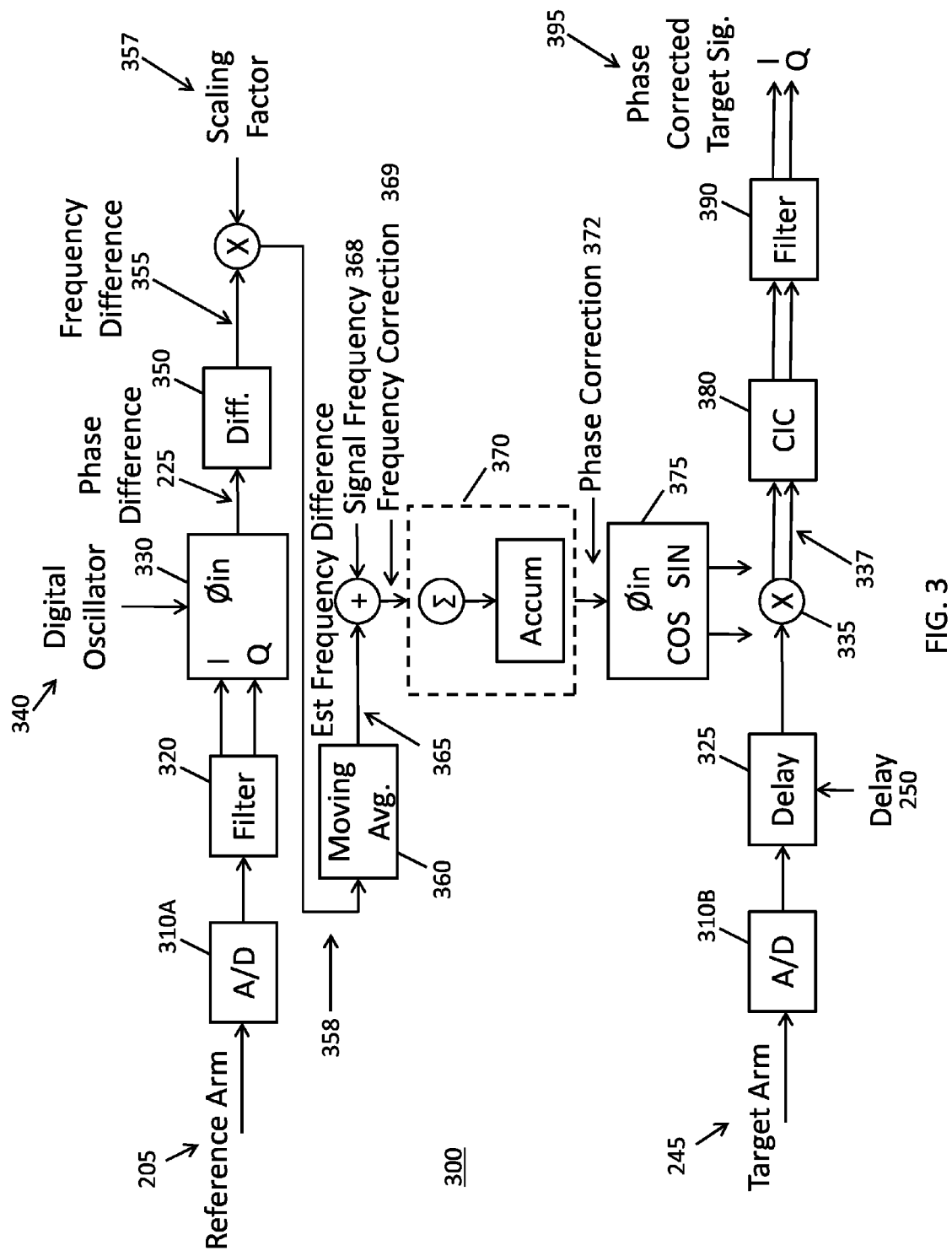
FIG. 3 illustrates a digital target phase correction system configured to correct a phase of a reflected target signal (i.e., target signal) received by a coherent lidar system, according to various implementations of the invention.

FIG. 3 illustrates a digital target phase correction system 300 configured to correct a phase of a target arm signal 245 received by a lidar system, according to various implementations of the invention. As discussed above, reference arm signal 205 corresponds to the output of the detector that detects the reference beam originally split from the optical beam directed toward the target; and target arm signal 245 corresponds to the output of the detector that detects the reflected portion of the optical beam incident on and reflected back from the target.

Before discussing FIG. 3, a brief description of the processing associated with various implementations of the invention is now provided. For simplicity, the following discussion is referenced relative to the phase domain; however, in terms of implementation (such as that illustrated in FIG. 3), the frequency domain is utilized in part of the processing chain by applying a discrete-time differentiator to a phase signal (see e.g., differentiator 350).

A phase of the output of laser source 110 may be expressed as $phi(t)=phi_m(t)+phi_e(t)$, where $phi_m(t)$ is the phase progression over time of an ideal frequency-modulated laser signal and $phi_e(t)$ is the deviation from that ideal laser signal due to modulation noise and phase wandering as would be appreciated.

The reference arm measures a phase difference over time. If the reference arm signal phase expected in an ideally modulated, noise free system is subtracted from the phase progression of the sampled reference arm signal, a reference arm phase error difference signal that may be expressed as $phi_e(t)-phi_e(t-r)$ is left, where r is the delay difference in the reference arm interferometer. The reference arm phase error difference is a sampled version of $phi_e(t)$ passed through a discrete-time differentiator with tap spacing $m=r/T$ where T is the sampling period of the A/D converter 310A.

If sampling occurs fast relative to the frequency content of $phi_e(t)$ (i.e., the frequency of the phase variance, etc.) and the inverse of reference arm delay is large relative to the frequency content of $phi_e(t)$, then the reference arm phase error difference will scale proportionally with reference arm delay r: $dphi_e(t)/dt<1/T$ and $dphi_e(t)/dt<1/r$, where d/dt denotes the derivative with respect to time. The application of scaling factor 357 (to be discussed below) removes this scaling. In some implementations, the scaling factor applied is r/T to create the phase error progression as would be measured with a reference arm of a length equal to one A/D converter sampling period.

In some implementations, digital target phase correction system 300 includes an analog-to-digital ("A/D") converter 310A that digitizes reference arm signal 205 with a sampling period of 1/T and a digital filter 320 that conditions the output of A/D converter 310A as would be appreciated. In some implementations, digital filter 320 corresponds to a Hilbert transform filter, though other filters may be used as would be appreciated. In some implementations, digital filter 320 outputs phase and quadrature components of digitized reference arm signal 205 as would also be appreciated.

In some implementations, digital target phase correction system 300 includes a digital oscillator 340 which provides a reference frequency against which a phase difference 225 present in digitized reference arm signal 205 can be determined by a phase detector 330 as would be appreciated. In some implementations, the reference frequency signal 340 is selected to bring reference arm signal 205 to baseband, effectively implementing the subtraction of the expected phase progression of a reference signal in an ideally modulated, noise-free system. Signal 225 is the reference arm phase error difference signal mentioned above.

In some implementations, for ease of implementation, the reference arm phase error difference signal is converted to a frequency error difference signal 355 by applying a discrete-time differentiator 350.

In some implementations, a differentiator 350 receives phase error difference 225 and determines a frequency error difference 355. In some implementations, frequency error difference 355 is adjusted by a scaling factor 357. In some of these implementations, scaling factor 357 may be the scaling factor r/T mentioned above or a different scaling factor may be chosen to account for various system components affecting phase scaling. While illustrated in FIG. 3 as being applied to frequency difference 355, scaling factor 357 may be applied at various points and in various portions of digital target phase correction system 300 so that an overall scaling factor 357 accounts for these differences in path lengths as would be appreciated.

Because $phi_e(t)$ cannot be measured directly using conventional devices, $phi_e(t)$ may be approximated by undoing the differentiation due to the phase differentiation by the reference arm delay path difference and phase detector by integrating output signal 358 of the scaling stage with a discrete-time integrator implemented as running sum. The resulting signal will be the concatenation of a discrete-tap differentiator with an integrator which is identical to a moving average of length r/T. Thus the signal to use for phase correction of the target signal is the best estimate of optical frequency error sampled with rate 1/T and convolved with moving average of r/T.

An estimate of the actual phase error present in the target arm signal can then be derived by duplicating the phase differentiation of the target arm interferometer in the digital domain. In some implementations, this may be achieved by applying a differentiator with tap spacing s/T where s is the path length difference of the target arm interferometer which depends on range to the target and internal optical delays. For sake of implementation ease, the discrete integrator and differentiator with tap spacing s/T are combined into moving averager 360 which will have a run length of s/T in some implementations. Other run lengths may be employed or other filters may be used in some implementations to accommodate system components affecting the phase of the target signal.

The output of moving averager 360 is a direct estimate of the frequency error in the target arm signal, so multiplying by −1 and applying it as frequency correction will yield the frequency corrected output signal. In some implementations, a phase correction may be applied by omission of block 350. For ease of implementation, the frequency correction is applied to the generation of the mixing signal frequency for the target arm signal which saves duplicating the sin/cos tables and a complex multiplier in some implementations of the invention.

In some implementations, frequency correction 365 may be applied to target arm signal 245 in combination with a frequency shift for further decimation and ease of processing. Signal frequency 368 is used in a conventional numeric oscillator implemented by phase accumulator 370 and sine/cosine table 375 to create the mixing frequency applied to modulator 335. Addition of estimated frequency correction 365 to the signal frequency 368 will create the appropriate correction signal summed with the mixing signal frequency 368 as combined frequency shift and frequency correction. In some implementations, an accumulator 370 accumulates frequency shift and correction 369 and outputs combined frequency shift and phase correction 372. Sine/cosine table 375 converts this phase signal to a unity-magnitude complex signal used to modulate the target arm signal with modulator 335. In some implementations, a converter 375 converts phase correction 372 into its inphase and quadrature components as would be appreciated.

In some implementations, digital target phase correction system 300 includes an A/D converter 310B that digitizes target arm signal 245. In some implementations, digital target phase correction system 300 includes a delay 325 that receives target arm signal 245 and introduces delay 250 into target arm signal 245. As discussed above, this delay corresponds to and compensates for delay(s) introduced by other components of target phase correction system 200 (e.g., phase accumulator 360, phase corrector/modulator 370, etc.), various processing delays as well as the roundtrip path delay based on the range to target. As above, delay 250 may be accomplished by applying different delays to both the target and reference arms as would be appreciated.

In some implementations, delay 325 may be adjusted to account for very small changes in delay 250 due to changes in the range to target. In fact, adjusting delay 325 ensures proper temporal alignment between reference arm signal 205 and target arm signal 245. Achieving a temporal alignment between these two signals within 5 samples or better in a system having a sampling period of 6.25 nanoseconds achieved significant improvement in performance of the lidar system.

In some implementations, target phase correction system 300 includes a modulator 335. Modulator 335 receives combined frequency shift and phase correction 372 (and in some implementations, the inphase and quadrature components thereof) and modulates it against delayed target arm signal 245 to compensate for phase error occurring in target arm signal 245 and outputs a phase corrected target arm signal 337. In some implementations, modulator 335 outputs inphase and quadrature components of phase corrected target arm 337 as would be appreciated.

In some implementations, a cascaded-integrator comb ("CIC") filter 380 is used to decimate phase corrected target arm signal 337. In some implementations, CIC filter 380 decimates phase corrected target arm signal 337 by a factor of N/3 (though other factors may be used as would be appreciated). In some implementations, a filter 390 (which may correspond to an FIR filter) decimates the output of CIC filter 380 by a factor of 3 (though again, other factors consistent with CIC filter 380 may be used as would be appreciated). The output of filter 390 corresponds to phase corrected target signal 395 downconverted to baseband and at a sample rate of several MHz.

In some implementations of the invention, components of target phase correction system 300 between A/D 310A and modulator 335 may be implemented in a field programmable point gate array device ("FPGA").

While the invention has been described herein in terms of various implementations, it is not so limited and is limited only by the scope of the following claims, as would be apparent to one skilled in the art. These and other implementations of the invention will become apparent upon consideration of the disclosure provided above and the accompanying figures. In addition, various components and features described with respect to one implementation of the invention may be used in other implementations as well.

What is claimed is:

1. A system for compensating for a phase variance of a laser source comprising:
   a phase difference detector configured to receive a reference arm signal and to detect a phase difference of the reference arm signal, the phase difference corresponding to a difference in the phase of the reference arm signal at two points in time;
   a phase correction estimator configured to receive the phase difference from the phase difference detector and to estimate a phase correction to be applied to a target arm signal, wherein the phase correction compensates for the phase variance of the laser source;
   a phase modulator configured to receive the phase correction from the phase correction estimator, to modulate the target arm signal with the phase correction, and to output a phase corrected target arm signal; and
   a delay coupled either to the reference arm signal and configured to introduce a delay time into the reference arm signal prior to being received by the phase difference detector or to the target arm signal prior to being received by the phase modulator, wherein the delay time comprises at least a round trip path delay.

2. The system of claim 1, wherein the delay is coupled to the target arm signal prior to being received by the phase modulator.

3. The system of claim 1, wherein the delay time is adjustable.

4. A method for compensating for a phase variance of a laser source, the method comprising:
- detecting, via a phase difference detector, a phase difference of a reference arm signal, the phase difference corresponding to a difference in the phase of the reference arm signal at two points in time;
- estimating a phase correction to be applied to a target arm signal based on the phase difference from the phase difference detector;
- modulating, via a phase modulator, the target arm signal with the phase correction thereby compensating the target arm signal for the phase variance of the laser source;
- outputting, by the phase modulator, a phase corrected target arm signal; and
- either delaying the reference arm signal by a delay time prior to the detecting or delaying the target arm signal by the delay time prior to the modulating, wherein the delay time comprises at least a round trip path delay.

5. The system of claim 4, wherein the delay time is adjustable.

* * * * *